United States Patent
Garing

(10) Patent No.: US 9,981,571 B2
(45) Date of Patent: May 29, 2018

(54) ELECTRONICALLY ACTUATED MECHANICAL CABLE RELEASE FOR LOCKING GAS SPRING AND METHOD

(71) Applicant: B/E Aerospace, Inc., Wellington, FL (US)

(72) Inventor: Francis Xavier L. Garing, Atlanta, GA (US)

(73) Assignee: B/E Aerospace, Inc., Winston-Salem, NC (US)

(*) Notice: Subject to any disclaimer, the term of this patent is extended or adjusted under 35 U.S.C. 154(b) by 231 days.

(21) Appl. No.: 14/666,994

(22) Filed: Mar. 24, 2015

(65) Prior Publication Data

US 2015/0274038 A1    Oct. 1, 2015

Related U.S. Application Data

(60) Provisional application No. 61/972,541, filed on Mar. 31, 2014.

(51) Int. Cl.
*B60N 2/23* (2006.01)
*F16C 1/16* (2006.01)

(52) U.S. Cl.
CPC ............ *B60N 2/231* (2013.01); *B60N 2/797* (2018.02); *F16C 1/16* (2013.01); *Y10T 74/18832* (2015.01)

(58) Field of Classification Search
CPC .............................. B60N 2/231; B60N 2/4693
USPC ...................................................... 297/362.13
See application file for complete search history.

(56) References Cited

U.S. PATENT DOCUMENTS

| | | | |
|---|---|---|---|
| 3,762,766 A * | 10/1973 | Barecki | B64D 11/06 297/217.1 X |
| 5,199,764 A | 4/1993 | Robinson | |
| 5,947,559 A | 9/1999 | Williams | |
| 8,365,874 B2 | 2/2013 | Huang et al. | |
| 8,665,103 B2 | 3/2014 | Hayakawa et al. | |
| 2002/0069753 A1* | 6/2002 | Lauderbach | F16F 9/0263 92/137 X |
| 2006/0026764 A1 | 2/2006 | Mossbeck | |
| 2007/0001499 A1 | 1/2007 | Smith | |
| 2012/0217779 A1 | 8/2012 | Gaither et al. | |

FOREIGN PATENT DOCUMENTS

EP    0564066 A1    10/1993

OTHER PUBLICATIONS

International Search Report for PCT/US2015/022233 dated Jun. 22, 2015.
Communication Pursuant to Article 94(3) EPC dated Sep. 4, 2017 (6 pages).

* cited by examiner

*Primary Examiner* — Anthony D Barfield
(74) *Attorney, Agent, or Firm* — Clements Bernard Walker PLLC

(57) ABSTRACT

A cable release mechanism for a seat of the type having a seat bottom and a seat back adapted to be moved by a lockable gas spring between upright and reclined positions relative to the seat bottom. An electric motor is operatively attached to the gas spring by a cable movable by the motor to move the seat back between the upright and reclined positions, and a switch is electrically connected to the motor for initiating operation of the motor to move the cable. A related method is also disclosed.

7 Claims, 2 Drawing Sheets

Figure 1:
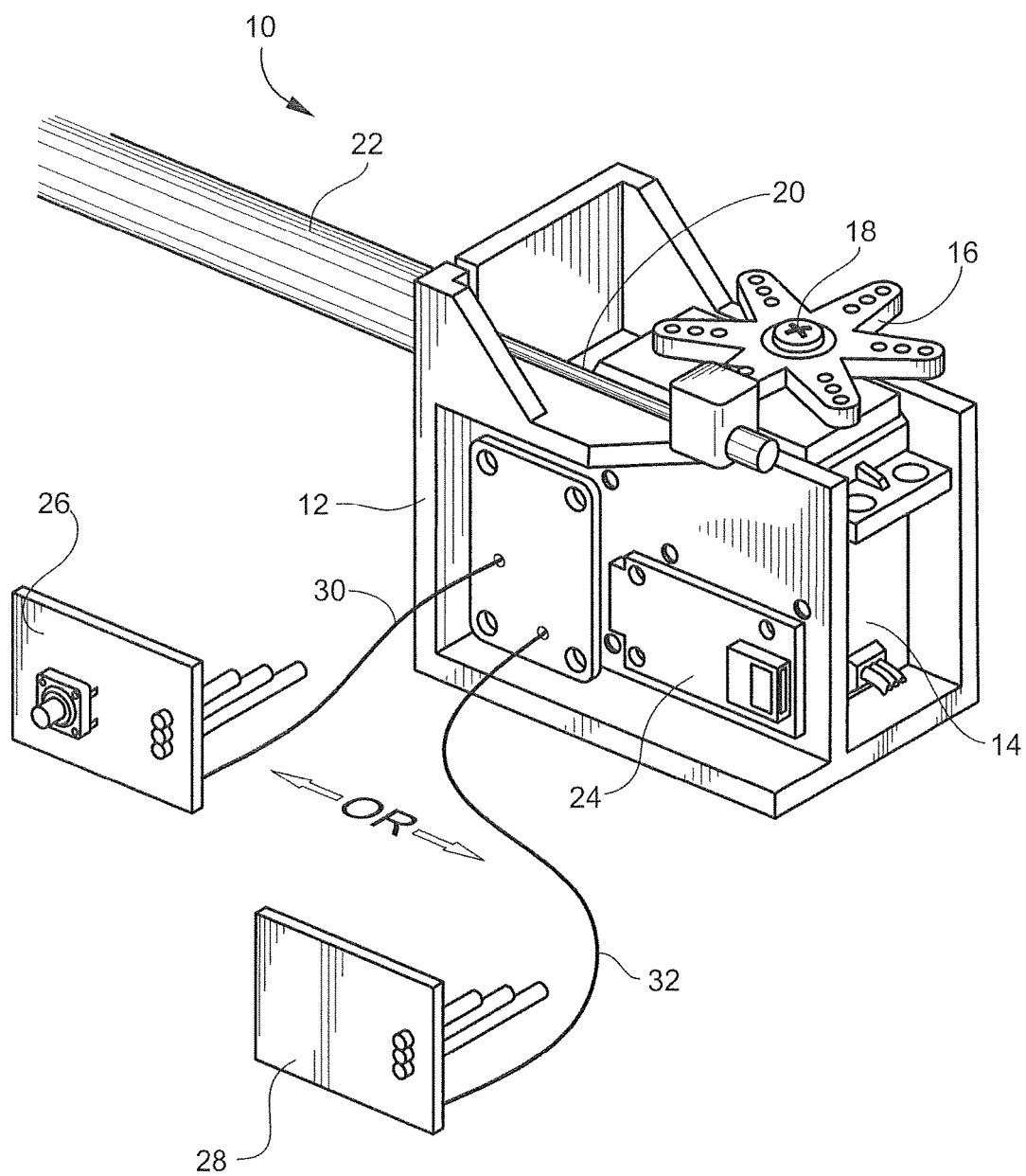

ELECTRONICALLY ACTUATED MECHANICAL CABLE RELEASE FOR LOCKING GAS SPRING AND METHOD

PRIORITY CLAIM

This application claims priority from U.S. Provisional Patent Application No. 61/972,541, filed Mar. 31, 2014, the contents of which are incorporated into this application in its entirety.

TECHNICAL FIELD AND BACKGROUND OF THE INVENTION

This invention relates to a mechanical cable release mechanism for a locking gas spring that is actuated by an electric motor and triggered by an electronic switch. The electronic switch can be triggered by a variety of switching mechanisms, such as a mechanical switch or capacitive switch. The cable release provides the reliability and simplicity of mechanical cable releases and the compact size and greater flexibility of an electronic system. The cable release has application in, for example, aircraft seating products, and the illustrative embodiment disclosed in this application is of a cable release for an aircraft passenger seat whereby the seat back can be placed into upright and recline positions by a passenger-actuated button on a seat component such as an armrest. The control electronics and electric motor are packaged as one assembly thereby achieving an efficient, compact arrangement particularly suitable for the confined space available in an aircraft cabin.

This application also discloses a method of equipping a seat with a mechanical release mechanism.

SUMMARY OF THE INVENTION

It is therefore an object of the present invention to provide a cable release mechanism for a locking gas spring that is triggered by an electronic switch.

It is another object of the invention to provide a cable release mechanism for a locking gas spring that is actuated by an electric motor.

It is another object of the invention to provide a cable release mechanism for a locking gas spring that is actuated by an electric motor and triggered by an electronic switch.

It is another object of the invention to provide an aircraft seat cable release mechanism for a locking gas spring that is triggered by an electronic switch.

It is another object of the invention to provide an aircraft seat cable release mechanism for a locking gas spring that is actuated by an electric motor.

It is another object of the invention to provide an aircraft seat cable release mechanism for a locking gas spring that is actuated by an electric motor and triggered by an electronic switch.

It is another object of the invention to provide an aircraft seat cable release mechanism for a locking gas spring that is triggered by an electronic switch that is adapted for allowing passenger control of a seat back recline mechanism.

It is another object of the invention to provide an aircraft seat cable release mechanism for a locking gas spring that is actuated by an electric motor that is adapted for allowing passenger control of a seat back recline mechanism.

It is another object of the invention to provide an aircraft seat cable release mechanism for a locking gas spring that is actuated by an electric motor and triggered by an electronic switch that is adapted for allowing passenger control of a seat back recline mechanism.

These and other objects and advantages of the invention are achieved by providing a cable release mechanism for a seat of the type having a seat bottom and a seat back, wherein the seat back is adapted to be moved by a lockable gas spring mounted on the seat between upright and reclined positions relative to the seat bottom. The mechanism includes an electric motor operatively attached to the gas spring by a cable movable by the motor to move to actuate the gas spring and thereby move the seat back between the upright and reclined positions. A switch is electrically connected to the motor for initiating operation of the motor to move the cable.

According to another embodiment of the invention, the cable is contained within a stationary sheath stationarily fixed to a housing of the motor.

According to another embodiment of the invention, the switch is an electrically-powered mechanical switch.

According to another embodiment of the invention, the motor includes a windlass rotatable by the motor to which the cable is connected.

According to another embodiment of the invention, the switch is an electrically-powered capacitive switch.

According to another embodiment of the invention, the switch is an electrically-powered mechanical switch mounted on an armrest of the seat.

According to another embodiment of the invention, the switch is an electrically-powered capacitive switch mounted on an armrest of the seat.

According to another embodiment of the invention, the gas spring and the motor are positioned proximate each other on the seat in order to enable the cable extending between the motor and gas spring to be a correspondingly short length.

According to another embodiment of the invention, a cable release mechanism for a seat of the type having a seat bottom and a seat back is provided, wherein the seat back is adapted to be moved by a lockable gas spring mounted on the seat between upright and reclined positions relative to the seat bottom. The mechanism includes an electric motor mounted on the seat and operatively attached to the gas spring by a cable movable by the motor to move to actuate the gas spring and thereby move the seat back between the upright and reclined positions. The electric motor includes a windlass rotatable by the motor to which the cable is connected. A stationary sheath is provided within which the cable is mounted for relative movement. An electrically-powered switch is mounted the seat and electrically connected to the motor for initiating operation of the motor to move the cable.

According to a method embodiment of the invention, a method of operating a seat back recline mechanism of a seat of the type having a seat bottom and a seat back is disclosed, wherein the seat back is adapted to be moved by a lockable gas spring mounted on the seat between upright and reclined positions relative to the seat bottom that includes the steps of providing an electric motor operatively attached to the gas spring by a cable movable by the motor to move to actuate the gas spring and thereby move the seat back between the upright and reclined positions, and providing a switch electrically connected to the motor for initiating operation of the motor to move the cable.

According to another embodiment of the invention, the method includes the step of providing a sheath the cable stationarily fixed to a housing of the motor, and positioning the cable within the sheath for relative movement in the sheath.

According to another embodiment of the invention, the step of providing the switch comprises the step of providing an electrically-powered mechanical switch.

According to another embodiment of the invention, the method includes the step of providing the motor with a windlass rotatable by the motor to which the cable is connected for moving the cable.

According to another embodiment of the invention, the method includes the step of mounting the switch on an armrest of the seat.

According to another embodiment of the invention, the method includes the step of positioning the gas spring and the motor proximate each other on the seat in order to enable the cable extending between the motor and gas spring to be a correspondingly short length.

BRIEF DESCRIPTION OF THE DRAWING FIGURES

Figure 2:
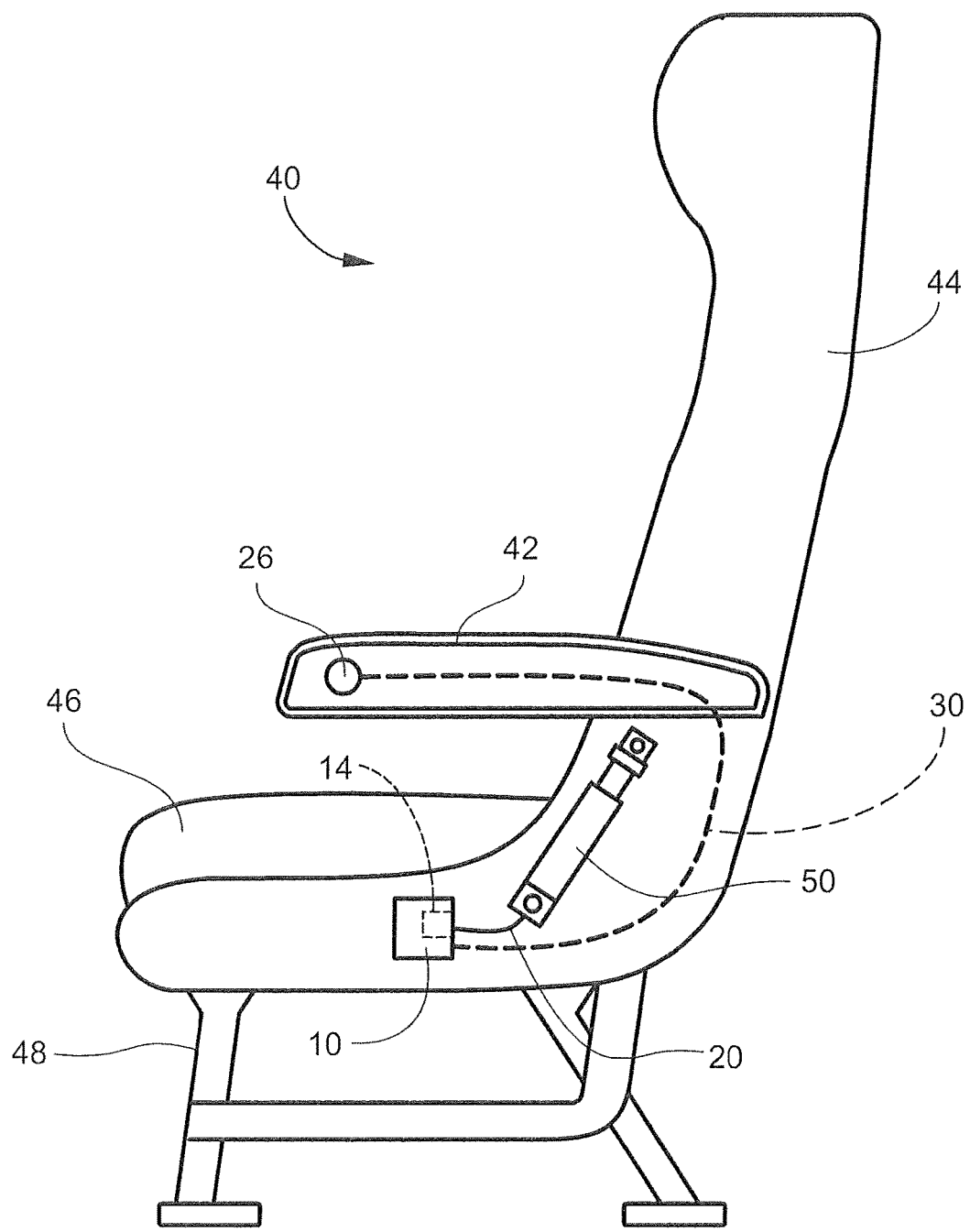

The present invention is best understood when the following detailed description of the invention is read with reference to the accompanying drawings, in which:

FIG. 1 is a schematic perspective view of an aircraft seat cable release mechanism for a locking gas spring that is actuated by an electric motor and triggered by an electronic switch that is adapted for allowing passenger control of a seat back recline mechanism according to an embodiment of the invention; and FIG. 2 is a simplified schematic side elevation view of the cable release mechanism of FIG. 1.

DETAILED DESCRIPTION OF THE PREFERRED EMBODIMENT

Referring now to FIG. 1, a cable release mechanism is shown at reference numeral 10 and includes a housing 12 in which is contained an electric motor 14. The motor 14 has a windlass 16 fixed to a drive shaft 18 that pulls a sheathed cable 20 that is fixed to the windlass 16. The sheath 22 is fixed in a stationary position, for example to the motor's housing 12. The motor 14 is controlled by control electronics 24 that allow the adjustment and control of the amount of travel imparted to the cable 20. Rotation of the drive shaft 18 by the motor 14 rotates the windlass 16 which in turn drives the cable 20 fore or aft in relation to the stationary sheath 22.

The motor 14 can be actuated by a number of external stimuli, including a mechanical displacement switch, capacitive switch, resistive switch, light switch, and the like. In FIG. 1, a mechanical switch 26 and a capacitive switch 28 are shown as alternative actuation devices, connected to the cable release mechanism 10 by electric wires 30 and 32, respectively. The mechanical cable release components can be located in an optimal position without having to create provisions for routing the mechanical cable 20 and cable sheath 22.

Referring now to FIG. 2, a seat 40 is provided with the mechanical switch 26 that is interconnected by electrically-conductive wire 30 from a seat armrest 42 to the cable release mechanism 10. The seat 40 also includes a seat back 44 and a seat bottom 46 mounted on a frame/leg assembly 48.

The cable 20 is connected to a lockable gas spring 50 which controls the position of the seat back 44 in relation to the seat bottom 46.

The routing of the cable 20 from the actuation point at the motor 14 to the point of interface at the lockable gas spring 50 is very short, and the bend radius typically associated with a sheathed cable is greatly reduced since the wire 30 takes the place of the cable 20 between the mechanical switch 26 to the cable release mechanism 10. Therefore, there is no requirement for physical motion of the cable 20 during actuation. The actuation force at the user input side, for example, the mechanical switch 26, is a constant, while the actuation force required by the sheathed cable 20 can be varied as required by sizing the motor 14 actuating the cable 20 accordingly.

In addition, the cable 20 can be simultaneously actuated by a plurality of inputs, for example, a touch screen, seat-mounted switches, or by a remote controller, for example.

A cable release mechanism for a locking gas spring that is actuated by an electric motor and triggered by an electronic switch according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

I claim:

1. An aircraft passenger seat including a cable release mechanism for actuating an adjustable feature, comprising:
    a mechanical actuator positioned within the aircraft passenger seat and configured to actuate the adjustable feature;
    a motor positioned within the aircraft passenger seat proximate the mechanical actuator;
    a cable interconnecting the motor and the mechanical actuator;
    a switch positioned within the aircraft passenger seat remote from the motor; and
    an electrical wire interconnecting the switch and the motor;
    wherein the switch is configured to actuate the motor to translate the cable to lock or unlock the mechanical actuator to adjust the adjustable feature; and
    wherein the mechanical actuator is a lockable gas spring, and the motor and the lockable gas spring are positioned proximate each other within a seat bottom portion of the aircraft passenger seat and the switch is positioned in an armrest portion of the aircraft passenger seat.

2. The aircraft passenger seat according to claim 1, wherein the cable is contained within a stationary sheath stationarily fixed to a housing of the motor.

3. The aircraft passenger seat according to claim 1, wherein the switch is an electrically-powered mechanical switch.

4. The aircraft passenger seat according to claim 1, wherein the motor includes a windlass rotatable by the motor to which the cable is connected.

5. The aircraft passenger seat according to claim 1, wherein the switch is an electrically-powered capacitive switch.

6. The aircraft passenger seat according to claim 1, wherein the switch is an electrically-powered mechanical switch mounted on an armrest of the aircraft passenger seat.

7. The aircraft passenger seat according to claim 1, wherein the switch is an electrically-powered capacitive switch mounted on an armrest of the aircraft passenger seat.

\* \* \* \* \*